(12) United States Patent
Kim et al.

(10) Patent No.: US 7,313,165 B2
(45) Date of Patent: Dec. 25, 2007

(54) DATA DETECTION FOR CODES WITH NON-UNIFORM SPREADING FACTORS

(75) Inventors: Younglok Kim, Seoul (KR); Pan Jung-Lin, Selden, NY (US); Ariela Zeira, Huntington, NY (US); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 672 days.

(21) Appl. No.: 10/834,321

(22) Filed: Apr. 28, 2004

(65) Prior Publication Data

US 2004/0202233 A1 Oct. 14, 2004

Related U.S. Application Data

(63) Continuation of application No. 10/064,307, filed on Jul. 1, 2002, now Pat. No. 6,741,653.

(51) Int. Cl.
    *H04B 1/707* (2006.01)
(52) U.S. Cl. ....................................... 375/147
(58) Field of Classification Search ............... 375/147, 375/149; 370/441
    See application file for complete search history.

(56) References Cited

U.S. PATENT DOCUMENTS 5,970,060 A  10/1999  Baier et al.

6,934,323 B2 *  8/2005  Hara ........................ 375/152
6,956,892 B2 * 10/2005  Ylitalo ..................... 375/144
7,099,377 B2 *  8/2006  Berens et al. ............ 375/130
2002/0176392 A1 11/2002  Reznik
2003/0021249 A1  1/2003  Kim et al.

FOREIGN PATENT DOCUMENTS

WO        01/22610        3/2001

OTHER PUBLICATIONS

Karimi, "Efficient Multi-Rate Multi-User Detection for the Asynchronous WCDMA Uplink", Vehicular Technology Conference, 1999, IEEE vol. 1, Sep. 19, 2001, pp. 593-597.
A. Klein et al., "Zero Forcing and Minimum Mean-Square-Error Equalization for Multiuser Detection in Code-Division Multiple-Access Channels," IEEE Transactions on Vehicular Tehnology, US, IEEE Inc. New York, vol. 45, No. 2, May 1, 1996 pp. 276-287.

(Continued)

*Primary Examiner*—Kevin Kim
(74) *Attorney, Agent, or Firm*—Volpe and Koenig, P.C.

(57) ABSTRACT

A plurality of communication signals is received. Each communication signal has an associated code. At least two of the communication signals has a different spreading factor. The associated codes have a scrambling code period. A total system response matrix has blocks. Each block has one dimension of a length M and another dimension of a length based on in part M and the spreading factor of each communication. M is based on the scrambling code period. Data of the received plurality of communication signals is received using the constructed system response matrix.

24 Claims, 3 Drawing Sheets

OTHER PUBLICATIONS

H. R. Karimi et al., "A Novel and Efficient Solution to Block-Based Joint-Detection Using Approximate Cholesky Factorization," IEEE International Symposium on Personal, Indoor and Mobile Radio Communications, vol. 3, 1998, pp. 1340-1345.

J Mayer et al., "Realtime Feasibility of Joint Detection CDMA," EPMCC, European Personal Mobile Communications Conference Together with Kommunikation, vol. 145, No. 145, 1997, pp. 245-25.

Klein et al., "Linear Unbiased Data Estimation in Mobile Radio Systems Applying CDMA," IEEE Journal on Selected Areas in Communications, vol. 11, No. 7, Sep. 1193, pp. 1058-1066.

Benvenuto et al., "Joint Detection with Low Computational Complexity for Hybrid TD-CDMA Systems," IEEE Journal on Selected Areas in Communications, vol. 19, No. 1, Jan. 2001, pp. 245-253.

* cited by examiner

DATA DETECTION FOR CODES WITH NON-UNIFORM SPREADING FACTORS

CROSS REFERENCE TO RELATED APPLICATION(S)

This application is a continuation of U.S. patent application No. 10/064,307, filed Jul. 1, 2002 now U.S. Pat. No. 6,741,653, which is incorporated by reference as if fully set forth.

BACKGROUND

This invention generally relates to wireless code division multiple access communication systems. In particular, the invention relates to data detection of communications having non-uniform spreading factors in such systems.

In code division multiple access (CDMA) communication systems, multiple communications may be simultaneously sent over a shared frequency spectrum. Each communication is distinguished by the code used to transmit the communication. Data symbols of a communication are spread using chips of the code. The number of chips used to transmit a particular symbol is referred to as the spreading factor. To illustrate, for a spreading factor of sixteen (16), sixteen chips are used to transmit one symbol. Typical spreading factors (SF) are 16, 8, 4, 2 and 1 in TDD/CDMA communication systems.

In some CDMA communication systems to better utilize the shared spectrum, the spectrum is time divided into frames having a predetermined number of time slots, such as fifteen time slots. This type of system is referred to as a hybrid CDMA/time division multiple access (TDMA) communication system. One such system, which restricts uplink communications and downlink communications to particular time slots, is a time division duplex communication (TDD) system.

One approach to receive the multiple communications transmitted within the shared spectrum is joint detection. In joint detection, the data from the multiple communications is determined together. The joint detector uses the, known or determined, codes of the multiple communications and estimates the data of the multiple communications as soft symbols. Some typical implementations for joint detectors use zero forcing block linear equalizers (ZF-BLE) applying Cholesky or approximate Cholesky decomposition or fast Fourier transforms.

These implementations are typically designed for all the communications to have the same spreading factor. Simultaneously handling communications having differing spreading factors is a problem for such systems.

Accordingly, it is desirable to be able to handle differing spreading factors in joint detection.

SUMMARY

A plurality of communication signals is received. Each communication signal has an associated code. At least two of the communication signals has a different spreading factor. The associated codes have a scrambling code period. A total system response matrix has blocks. Each block has one dimension of a length M and another dimension of a length based on in part M and the spreading factor of each communication. M is based on the scrambling code period. Data of the received plurality of communication signals is received using the constructed system response matrix.

DETAILED DESCRIPTION OF THE PREFERRED EMBODIMENT(S)

The embodiments of the invention can generally be used with any type of CDMA system, such as a TDD/CDMA, TDMA/CDMA or frequency division duplex/CDMA communication system; as well as other types of communication systems.

Figure 1:
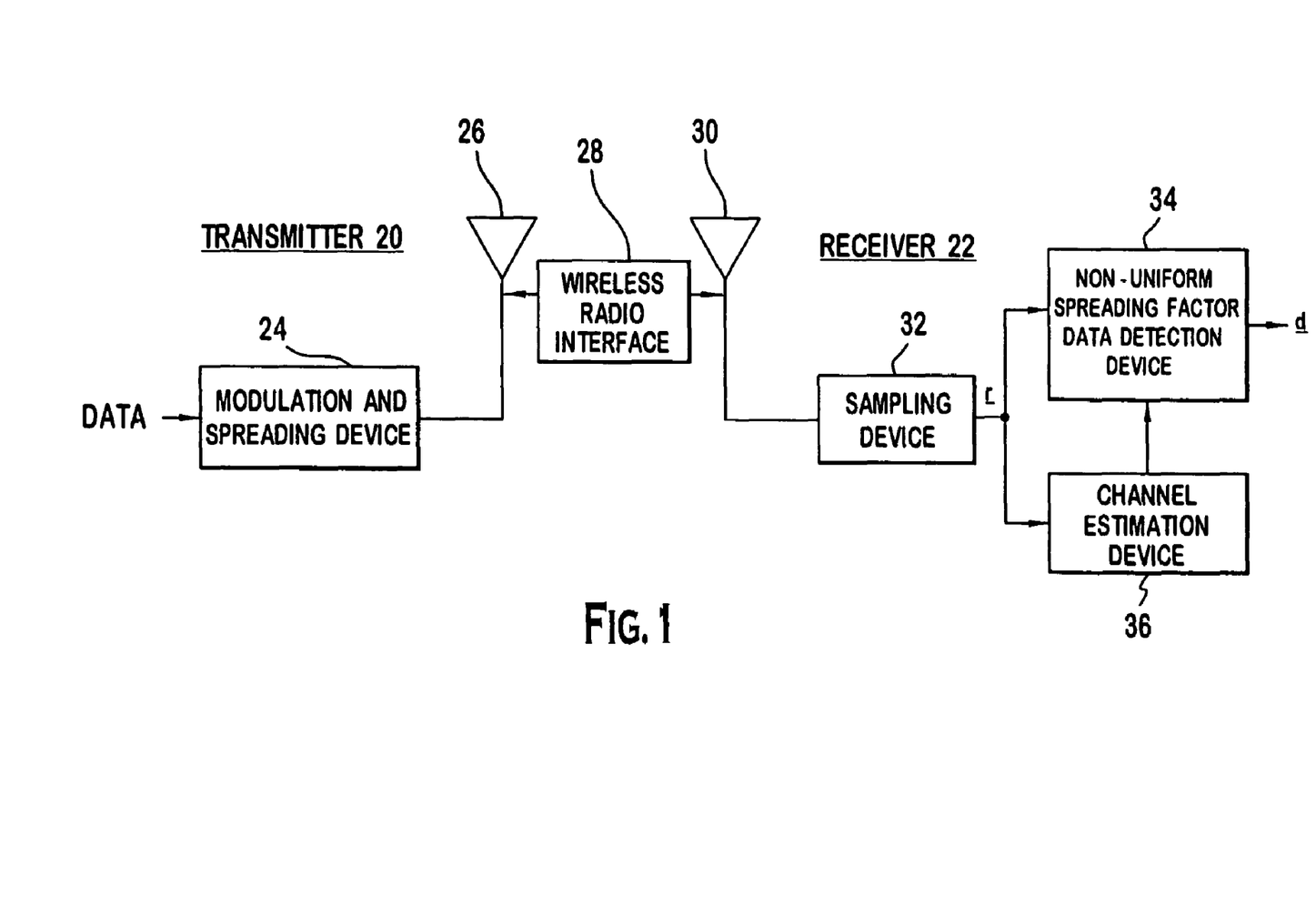
FIG. 1 is an embodiment of a non-uniform spreading factor communication system.

FIG. 1 illustrates an embodiment of a non-uniform spreading factor communication system. A transmitter 20 and a receiver 22 are shown in FIG. 1. The transmitter 20 may be located at a user equipment or multiple transmitting circuits 20 may be located at the base station. The receiver 22 may be located at either the user equipment, base station or both, although the preferred use of the receiver 22 is for use at a base station for reception of uplink communications.

Data symbols to be transmitted to the receiver 22 are processed by a modulation and spreading device 24 at the transmitter 20. The modulation and spreading device 24 spreads the data with the codes and at spreading factors assigned to the communications carrying the data. The communications are radiated by an antenna 26 or antenna array of the transmitter 20 through a wireless radio interface 28.

At the receiver 22, the communications, possibly along with other transmitters' communications, are received at an antenna 30 or antenna array of the receiver 22. The received signal is sampled by a sampling device 32, such as at the chip rate or at a multiple of the chip rate, to produce a received vector, $\underline{r}$. The received vector is processed by a channel estimation device 36 to estimate the channel impulse responses for the received communications. The channel estimation device 36 may use a training sequence in the received communication, a pilot signal or another technique to estimate the impulse responses. A non-uniform spreading factor data detection device 34 uses the codes of the received communications and the estimated impulse responses to estimate soft symbols, d, of the spread data.

Figure 2:
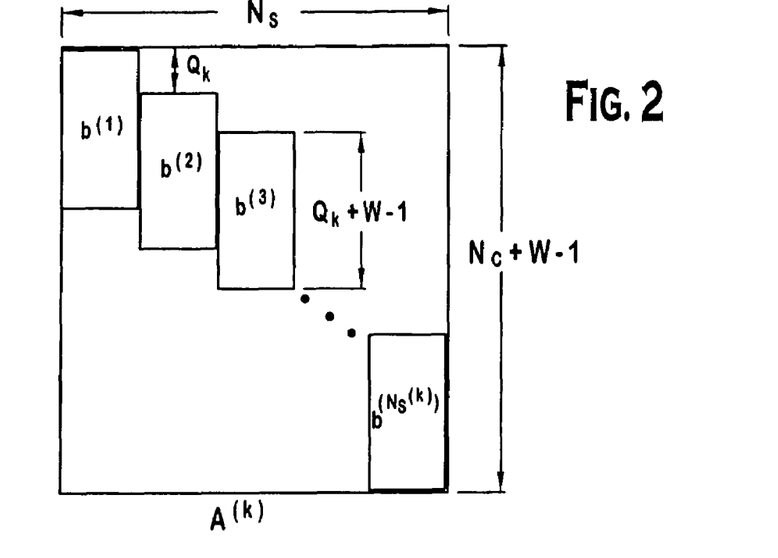
FIG. 2 is an illustration of a system response matrix for a $k^{th}$ communication.
Figure 3:
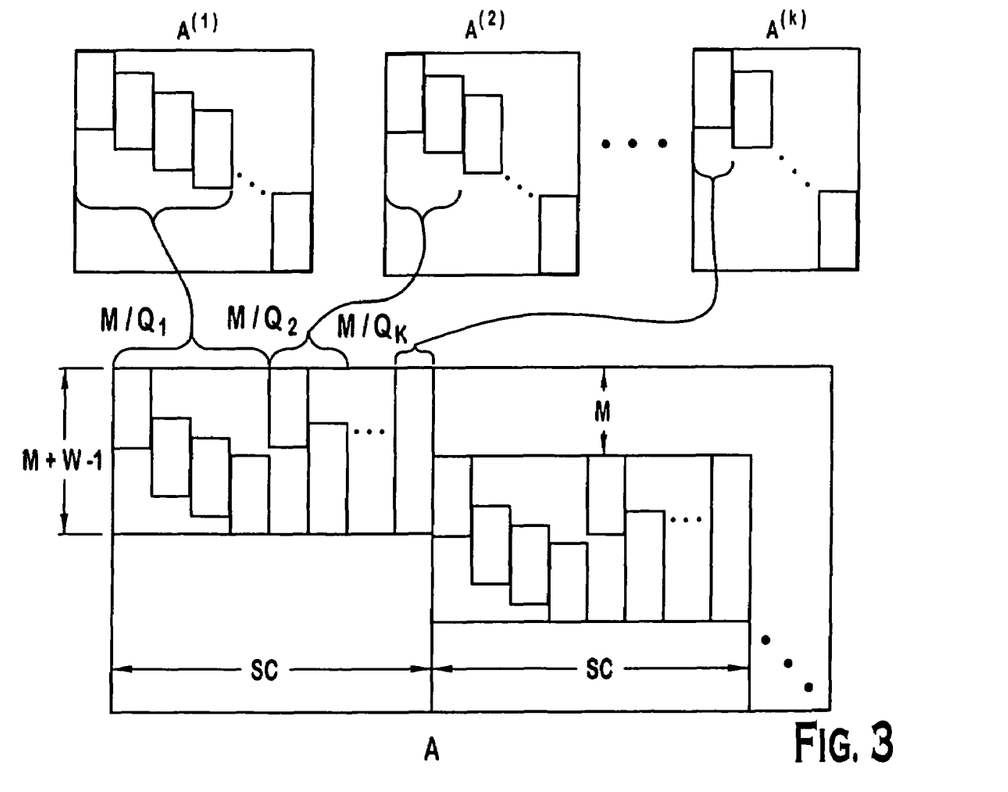
FIG. 3 is an illustration of constructing a total system response matrix.
Figure 4:
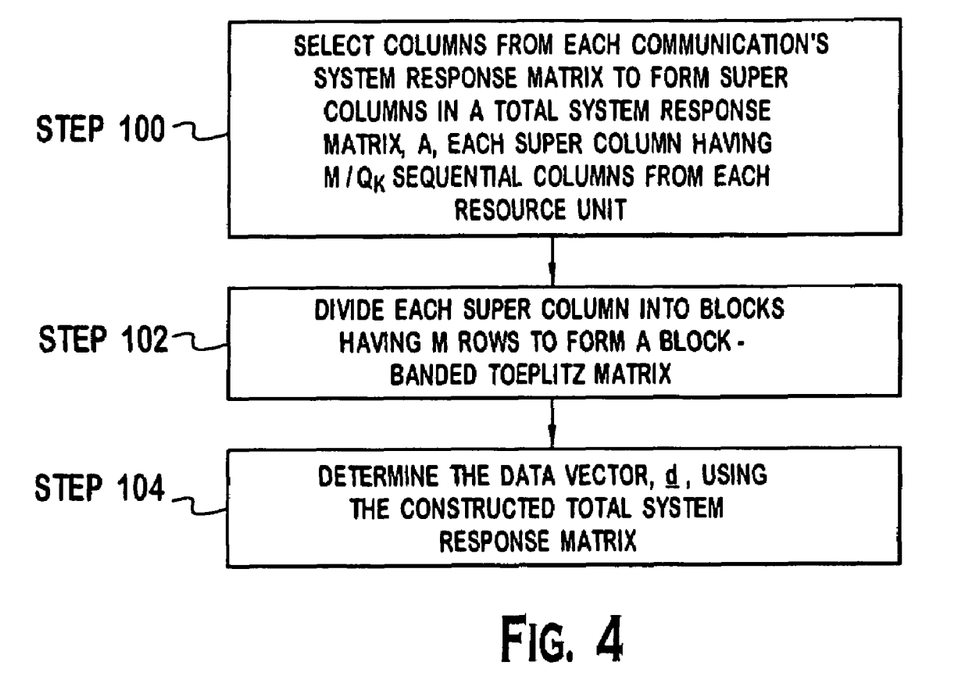
FIG. 4 is a flow chart of detecting data from communications having non-uniform spreading factors.

Data detection for codes having non-uniform spreading factors is illustrated in FIGS. 2 and 3 and is described with the flow chart of FIG. 4. A number, K, communications are transmitted during an observation interval. In a TDD/CDMA communication system, an observation interval is typically one data field of a communication burst. However, in TDD/CDMA as well as other CDMA communication systems, other size observation intervals may be used, such as the period of the scrambling codes.

The samples of the combined received K communications are collected over the observation interval as a received vector, $\underline{r}$. The length in chips of $\underline{r}$ is the number of chips transmitted in the observation interval of each communication, $N_c$, added to the length of the channel impulse response, W, less one, $(N_c+W-1)$.

A $k^{th}$ communication of the K communications as transmitted can be represented as $\underline{x}^{(k)}$. An $i^{th}$ chip within a symbol boundary of each symbol is defined as $x_i^{(k)}$ and is per Equation 1.

$$\underline{x}_i^{(k)} = \sum_{n=1}^{N_s^{(k)}} d_n^{(k)} \underline{v}_i^{(n,k)} \qquad \text{Equation 1}$$

$N_s^{(k)}$ is the number of symbols of the $k^{th}$ communication in the observation interval. $d_n^{(k)}$ is the symbol value of an nth symbol of the $N_s^{(k)}$ symbols. $\underline{v}^{(n,k)}$ is the portion of the code sequence of the $k^{th}$ communication within the $n^{th}$ symbol boundary ($\underline{v}^{(n,k)}$ is zero outside the $n^{th}$ symbol boundary). $\underline{v}_i^{(n,k)}$ is the $i^{th}$ chip of the portion of the code sequence within the symbol boundary ($\underline{v}_i^{(n,k)}$ is zero except for the $i^{th}$ chip within the $n^{th}$ symbol boundary).

Equation 1 can be extended to a matrix equation per Equation 2.

$$\underline{x}^{(k)} = V^{(k)} \underline{d}^{(k)} \qquad \text{Equation 2}$$

$V^{(k)}$ is a spreading matrix for communication k and has $N_s^{(k)}$ columns and $N_c$ rows. An $n^{th}$ column of $V^{(k)}$ is $v^{(n,k)}$.

After transmission through the wireless channel, $\underline{x}^{(k)}$ experiences a channel impulse response $\underline{h}^{(k)}$. $\underline{h}^{(k)}$ is W chips in length. $\underline{h}_j^{(k)}$ is a $j^{th}$ chip of $h^{(k)}$. Ignoring noise, the contribution, $\underline{r}^{(k)}$ of communication k to the received vector, $\underline{r}$, is per Equation 3.

$$\underline{r}^{(k)} = \sum_{j=1}^{W} h_j^{(k)} x_{i-j+1}^{(k)} = \qquad \text{Equation 3}$$

$$\sum_{j=1}^{W} h_j^{(k)} \sum_{n=1}^{N_s^{(k)}} d_n^{(k)} \underline{v}_{i-j+1}^{(n,k)} = \sum_{n=1}^{N_s^{(k)}} d_n^{(k)} \sum_{j=1}^{W} h_j^{(k)} \underline{v}_{i-j+1}^{(n,k)}$$

In matrix form, Equation 3 is per Equation 4.

$$\underline{r}^{(k)} = H^{(k)} V^{(k)} \underline{d}^{(k)} \qquad \text{Equation 4}$$

$H^{(k)}$ is the channel response matrix for communication k and has $N_c$ columns and $(N_c+W-1)$ rows. The support of an $i^{th}$ column of $H^{(k)}$ is the channel impulse response $h^{(k)}$. The first element of the support for an $i^{th}$ column of $H^{(k)}$ is the $i^{th}$ element of that column.

For each communication k, a system transmission matrix $A^{(k)}$ can be constructed per Equation 5.

$$A^{(k)} = H^{(k)} V^{(k)} \qquad \text{Equation 5}$$

FIG. 2 is an illustration of a system response matrix $A^{(k)}$. Each column of the matrix corresponds to one data symbol of the communication. As a result, the matrix has $N_s^{(k)}$ columns. Each $i^{th}$ column has a block $b^{(i)}$ of non-zero elements. The number of non-zero elements is determined by adding the $k^{th}$ communication's spreading factor, $Q_k$, and the impulse response length, W, minus 1, $(Q_k+W-1)$. The left-most column has a block $b^{(1)}$ starting at the top of the column. For each subsequent column, the block starts $Q_k$ chips lower in the matrix. The resulting overall height of the matrix in chips is $(N_c+W-1)$.

A total system transmission matrix can be formed by combining each communication's system response matrix $A^{(k)}$, such as per Equation 6.

$$A = [A^{(1)}, A^{(2)}, \ldots, A^{(K)}] \qquad \text{Equation 6}$$

However, such a total system response matrix A would have an extremely large bandwidth. To reduce the matrix bandwidth, a block-banded toeplitz matrix is constructed, having the columns of the matrix of Equation 6 rearranged.

The height, (M+W−1), of blocks in the matrix is based on the period of the scrambling code. In many communication systems, the scrambling code repeats over a specified number of chips. To illustrate for a TDD/CDMA communication system, the scrambling code repeats after 16 chips (M=16).

A maximum spreading code of the K communications or a maximum spreading code of the communication system is referred to as $Q_{MAX}$. To illustrate, a typical TDD/CDMA communication system has a maximum spreading factor of 16 and a receiver in such a system receives communications having spreading factors of 4 and 8. In such a system, $Q_{MAX}$ may be 16 (the maximum of the system) or 8 (the maximum of the received communications).

If the scrambling code period is not an integer multiple of $Q_{MAX}$, a multiple of the period may be used instead of M for constructing the blocks. To illustrate, if $Q_{MAX}$ is 16 and the period is 24, three times the period (48 chips) may be used, since it is evenly divisible by 16 and 24.

Initially, columns from $A^{(1)}, A^{(2)}, \ldots, A^{(K)}$ are selected to construct the A matrix based on each k communication's spreading factor. For the first columns of the A matrix, $M/Q_1$ of the first columns of $A^{(1)}$ are selected, as shown in FIG. 3. Using a second of the K matrices $A^{(2)}$, $M/Q_2$ columns are selected. This procedure is repeated for the other K matrices, $A^{(3)}, \ldots, A^{(K)}$. All of the K matrices first columns become a super column in the total system response matrix, A, having a number of columns, SC, per Equation 7, (step 100).

$$SC = \sum_{k=1}^{K} M/Q_k \qquad \text{Equation 7}$$

A second super column is constructed in the same manner by selecting the next columns in the $A^{(1)}, A^{(2)}, \ldots, A^{(K)}$ matrices. The other super columns are constructed in the same manner.

Although this illustration selects columns from the matrices in numerical order, $A^{(1)}, A^{(2)}, \ldots, A^{(K)}$, the order of the matrices can vary. Although the resource units can be arranged in any order and still achieve a reduced bandwidth, by placing resource units transmitted with the lowest spreading factors at the exterior of each block, the bandwidth may be further reduced. However, in some implementations, the potential reduction in bandwidth may not outweigh the added complexity for reordering the K communications.

Each super column is divided into blocks having M rows, as per Equation 8, (step 102).

$$A = \begin{bmatrix} B_1 & 0 & \cdots & 0 & 0 \\ \vdots & B_1 & \ddots & \vdots & \vdots \\ B_L & \vdots & \ddots & 0 & \vdots \\ 0 & B_L & \ddots & B_1 & 0 \\ \vdots & 0 & \ddots & \vdots & B_1 \\ 0 & \vdots & \ddots & B_L & \vdots \\ 0 & 0 & \cdots & 0 & B_L \end{bmatrix} \qquad \text{Equation 8}$$

As shown in Equation 8, the non-zero elements of each subsequent column is M rows (one block) lower in the matrix. The number of non-zero blocks in each column is L, which is per Equation 9.

$$L = \left\lceil \frac{M+W-1}{M} \right\rceil \quad \text{Equation 9}$$

The data detection can be modeled per Equation 10.

$$\underline{r} = A\underline{d} + \underline{n} \quad \text{Equation 10}$$

$\underline{n}$ is the noise vector. A zero-forcing solution to Equation 10 is per Equations 11 and 12.

$$A^H \underline{r} = R\underline{d} \quad \text{Equation 11}$$

$$R = A^H A \quad \text{Equation 12}$$

$(\cdot)^H$ is a complex conjugate transpose operation (Hermetian).

A minimum mean square error solution to Equation 10 is per Equations 13 and 14.

$$A^H \underline{r} = R\underline{d} \quad \text{Equation 13}$$

$$R = A^H A + \sigma^2 I \quad \text{Equation 14}$$

is the noise variance and I is the identity matrix.

To solve either Equation 11 or 13 in a brute force approach, a matrix inversion of R, $R^{-1}$, is required. Using the A matrix of Equation 8, the structure of the R matrix of either Equation 12 or 14 is per Equation 15.

$$R = \begin{bmatrix} R_0 & R_1 & R_2 & R_3 & R_{L-1} & 0 & 0 & 0 & 0 & 0 & 0 & 0 \\ R_1^H & R_0 & R_1 & R_2 & R_3 & R_{L-1} & 0 & 0 & 0 & 0 & 0 & 0 \\ R_2^H & R_1^H & R_0 & R_1 & R_2 & R_3 & R_{L-1} & 0 & 0 & 0 & 0 & 0 \\ R_3^H & R_2^H & R_1^H & R_0 & R_1 & R_2 & R_3 & R_{L-1} & 0 & 0 & 0 & 0 \\ R_{L-1}^H & R_3^H & R_2^H & R_1^H & R_0 & R_1 & R_2 & R_3 & R_{L-1} & 0 & 0 & 0 \\ 0 & R_{L-1}^H & R_3^H & R_2^H & R_1^H & R_0 & R_1 & R_2 & R_3 & R_{L-1} & 0 & 0 \\ 0 & 0 & R_{L-1}^H & R_3^H & R_2^H & R_1^H & R_0 & R_1 & R_2 & R_3 & R_{L-1} & 0 \\ 0 & 0 & 0 & R_{L-1}^H & R_3^H & R_2^H & R_1^H & R_0 & R_1 & R_2 & R_3 & R_{L-1} \\ 0 & 0 & 0 & 0 & R_{L-1}^H & R_3^H & R_2^H & R_1^H & R_0 & R_1 & R_2 & R_3 \\ 0 & 0 & 0 & 0 & 0 & R_{L-1}^H & R_3^H & R_2^H & R_1^H & R_0 & R_1 & R_2 \\ 0 & 0 & 0 & 0 & 0 & 0 & R_{L-1}^H & R_3^H & R_2^H & R_1^H & R_0 & R_1 \\ 0 & 0 & 0 & 0 & 0 & 0 & 0 & R_{L-1}^H & R_3^H & R_2^H & R_1^H & R_0 \end{bmatrix} \quad \text{Equation 15}$$

As shown in Equation 15, the R matrix, which is conventionally called the system correlation matrix, is block-banded and Toeplitz. As a result, solving either Equation 11 or 13 for $\underline{d}$ can be readily implemented using a block Cholesky or approximate Cholesky decomposition, (step 104). Alternately, using a circulant approximation of the R matrix, a block fast Fourier transform approach can be used to solve for $\underline{d}$, (step 104).

What is claimed is:

1. A method for simultaneously estimating data transmitted in a spread spectrum communication system using different spreading factors, the method comprising:
receiving a plurality of communication signals where at least two communication signals have a different spreading factor and each communication signal has an associated code that has a scrambling code period;
constructing a system matrix for each communication signal;
constructing a total system response matrix having a plurality of successive super columns (SCs) such that:
each SC includes a portion of all of the system matrices and has significant values in a respective highest significant row; and
each succeeding SC after a first SC has its highest significant row M rows lower than the highest significant row of a preceding SC, where M is at least the scrambling code period;
using the constructed system response matrix to estimate data of the received plurality of communication signals.

2. The method of claim 1 wherein the scrambling code period is the same for each communication signal and is used for M in constructing the total system response matrix.

3. The method of claim 1 wherein a multiple of the scrambling code periods is used for M in constructing the total system response matrix.

4. The method of claim 1 wherein the data estimating uses $A^H A$ in a zero forcing solution where A is the total system response matrix and $A^H$ is the complex conjugate transpose of A.

5. The method of claim 1 wherein the data estimating uses $A^H A + \sigma^2 I$ in a minimum mean square error solution, where A is the total system response matrix, $A^H$ is the complex conjugate transpose of A, $\sigma^2$ is noise variance and I is an identity matrix.

6. A user equipment comprising:
a receiver configured to receive a plurality of communication signals where at least two of the communication signals have a different spreading factor and each communication signal has an associated code that has a scrambling code period;
a data detection device configured to construct a system matrix for each communication signal;
said data detection device further configured to construct a total system response matrix having a plurality of successive super columns (SCs) from which to estimate data of the plurality of communication signals; and
said data detection device further configured to construct the total system response matrix such that:
each SC includes a portion of all of the system matrices and has significant values in a respective highest significant row; and each succeeding SC after a first SC has its highest significant row M rows lower than the highest significant row of a preceding SC, where M is at least the scrambling code period.

7. The user equipment of claim 6 wherein said data detection device is configured to estimate data using $A^H A$ in a zero forcing solution, where A is the total system response matrix and $A^H$ is the complex conjugate transpose of A.

8. The user equipment of claim 6 wherein said data detection device is configured to estimate data using $A^H A + \sigma^2 I$ in a minimum mean square error solution, where A is the total system response matrix, $A^H$ is the complex conjugate transpose of A, $\sigma^2$ is noise variance and I is an identity matrix.

9. A base station comprising:
a receiver configured to receive a plurality of communication signals where at least two of the communication signals have a different spreading factor and each communication signal has an associated code that has a scrambling code period;
a data detection device configured to construct a system matrix for each communication signal;
said data detection device further configured to construct a total system response matrix having a plurality of successive super columns (SCs) from which to estimate data of the plurality of communication signals; and
said data detection device further configured to construct the total system response matrix such that:
each SC includes a portion of all of the system matrices and has significant values in a respective highest significant row; and
each succeeding SC after a first SC has its highest significant row M rows lower than the highest significant row of a preceding SC, where M is at least the scrambling code period.

10. The base station of claim 9 wherein said data detection device is configured to estimate data using $A^H A$ in a zero forcing solution, where A is the total system response matrix and $A^H$ is the complex conjugate transpose of A.

11. The base station of claim 9 wherein said data detection device is configured to estimate data using $A^H A\ \sigma^2 I$ in a minimum mean square error solution, where A is the total system response matrix, $A^H$ is the complex conjugate transpose of A, $\sigma^2$ is noise variance and I is an identity matrix.

12. A method for simultaneously estimating data transmitted in a spread spectrum communication system using different spreading factors, the method comprising:
receiving a plurality of communication signals where at least two of the communication signals have a different spreading factor and each communication signal has an associated code that has a scrambling code period;
constructing a total system response matrix having a series of blocks comprising columns corresponding to data symbols in the communication signals such that:
each block is formed by grouping said columns based on an amount M which is a common multiple of the scrambling code period and a maximum spreading code of the communication system;
each block has a number of rows based on in part M and an impulse response of the communication system and a highest significant row; and
each block has a number of columns which is a sum of quotients, each quotient being M divided by each communications spreading factor;
where the blocks are arranged so that the first column in each block is M rows lower than the first column in a preceding block, except for a first block; and
constructing a system correlation matrix using the total system response matrix; and
estimating data of the received plurality of communication signals using either a Cholesky decomposition of the system correlation matrix or a circulant approximation of the system correlation matrix in conjunction with a block fast Fourier transform approach.

13. The method of claim 12 wherein the scrambling code period is the same for each communication signal and is used for M in constructing the total system response matrix.

14. The method of claim 12 wherein a least common multiple of the scrambling code period and the maximum spreading code of the communication system is used for M in constructing the total system response matrix.

15. The method of claim 12 wherein the system correlation matrix is formed using $A^H A$ in a zero forcing solution where A is the total system response matrix and $A^H$ is the complex conjugate transpose of A.

16. The method of claim 12 wherein the system correlation matrix is formed using $A^H A + \sigma^2 I$ in a minimum mean square error solution, where A is the total system response matrix, $A^H$ is the complex conjugate transpose of A, $\sigma^2$ is noise variance and I is an identity matrix.

17. A user equipment comprising:
a receiver configured to receive a plurality of communication signals where at least two of the communication signals have a different spreading factor and each communication signal has an associated code that has a scrambling code period;
a data detection device configured to construct a total system response matrix having a series of blocks comprising columns corresponding to data symbols in the communication signals such that:
each block is formed by grouping said columns based on an amount M which is a common multiple of the scrambling code period and a maximum spreading code of the communication system;
each block has a number of rows based on in part M and an impulse response of the communication system and a highest significant row; and
each block has a number of columns which is a sum of quotients, each quotient being M divided by each communication's spreading factor;
where the blocks are arranged so that the first column in each block is M rows lower than the first column in a preceding block, except for a first block; and
said data detection device configured to construct system correlation matrix using the total system response matrix; and
said data detection device configured to estimate data of the received plurality of communication signals using either a Cholesky decomposition of the system correlation matrix or a circulant approximation of the system correlation matrix in conjunction with a block fast Fourier transform approach.

18. The user equipment of claim 17 wherein said data detection device is configured to construct the system correlation matrix using $A^H A$ in a zero forcing solution, where A is the total system response matrix and $A^H$ is the complex conjugate transpose of A.

19. The user equipment of claim 17 wherein said data detection device is configured to construct the system correlation matrix using $A^H A\ \sigma^2 I$ in a minimum mean square error solution, where A is the total system response matrix, $A^H$ is the complex conjugate transpose of A, $\sigma^2$ is noise variance and I is an identity matrix.

20. The user equipment of claim 17 wherein said data detection device is configured to construct the total system response matrix using a least common multiple of the scrambling code period and the maximum spreading code of the communication system as M.

21. A base station equipment comprising:
a receiver configured to receive a plurality of communication signals where at least two of the communication signals have a different spreading factor and each communication signal has an associated code that has a scrambling code period;
a data detection device configured to construct a total system response matrix having a series of blocks comprising columns corresponding to data symbols in the communication signals such that:
each block is formed by grouping said columns based on an amount M which is a common multiple of the scrambling code period and a maximum spreading code of the communication system;
each block has a number of rows based on in part M and an impulse response of the communication system and a highest significant row; and
each block has a number of columns which is a sum of quotients, each quotient being M divided by each communications spreading factor;
where the blocks are arranged so that the first column in each block is M rows lower than the first column in a preceding block, except for a first block; and
said data detection device configured to construct system correlation matrix using the total system response matrix; and
said data detection device configured to estimate data of the received plurality of communication signals using either a Cholesky decomposition of the system correlation matrix or a circulant approximation of the system correlation matrix in conjunction with a block fast Fourier transform approach.

22. The base station of claim 21 wherein said data detection device is configured to construct the system correlation matrix using $A^H A$ in a zero forcing solution, where A is the total system response matrix and $A^H$ is the complex conjugate transpose of A.

23. The base station of claim 21 wherein said data detection device is configured to construct the system correlation matrix using $A^H A + \sigma^2 I$ in a minimum mean square error solution, where A is the total system response matrix, $A^H$ is the complex conjugate transpose of A, $\Gamma^2$ is noise variance and I is an identity matrix.

24. The base station of claim 21 wherein said data detection device is configured to construct the total system response matrix using a least common multiple of the scrambling code period and the maximum spreading code of the communication system as M.

* * * * *

UNITED STATES PATENT AND TRADEMARK OFFICE
CERTIFICATE OF CORRECTION

| | |
|---|---|
| PATENT NO. | : 7,313,165 B2 |
| APPLICATION NO. | : 10/834321 |
| DATED | : December 25, 2007 |
| INVENTOR(S) | : Kim et al. |

It is certified that error appears in the above-identified patent and that said Letters Patent is hereby corrected as shown below:

ON THE FACE PAGE

At section (75), Inventors: page 1, left column, lines 1 & 2, after "Seoul (KR)", delete "Pan Jung-Lin," and insert therefor --Jung-Lin Pan--.

At section (56), OTHER PUBLICATIONS, page 2, right column, line 3, after "Sep.", delete "1193" and insert therefor --1993--.

IN THE ABSTRACT

At section (57), ABSTRACT, page 1, right column, line 3, after the word "signals", delete "has" and insert therefor --have--.

IN THE SPECIFICATION

At column 2, line 48, after the word "symbols", delete "d" and insert therefor --$\underline{d}$--.

At column 3, line 20, before the word "columns", delete " $N_s^{(k)}$ " and insert therefor --$N_s^{(k)}$--.

At column 3, line 20, after the word "is", delete "$v^{(n,k)}$" and insert therefor --$\underline{v}^{(n,k)}$--.

At column 3, line 23, before the word "Ignoring", delete "$h^{(k)}$" and insert therefor --$\underline{h}^{(k)}$--.

At column 3, line 66, before the word "matrix", delete "toeplitz" and insert therefor --Toeplitz--.

At column 4, line 27, before the word "first", delete "matrices" and insert therefor --matrices'--.

At column 5, line 11, before the words "is the", delete "n", and insert therefor --$\underline{n}$--.

At column 5, delete Equation 11, and insert therefor --$A\underline{r}^H = R\underline{d}$--.

At column 5, line 17, after the word "operation", delete "Hermetian" and insert therefor --Hermitian--.

UNITED STATES PATENT AND TRADEMARK OFFICE
CERTIFICATE OF CORRECTION

PATENT NO. : 7,313,165 B2
APPLICATION NO. : 10/834321
DATED : December 25, 2007
INVENTOR(S) : Kim et al.

It is certified that error appears in the above-identified patent and that said Letters Patent is hereby corrected as shown below:

IN THE CLAIMS

At claim 12, column 7, line 64, before the word "spreading", delete "communications" and insert therefor --communication's--.

At claim 21, column 9, line 25, before the word "spreading", delete "communications" and insert therefor --communication's--.

At claim 23, column 10, line 20, before the words "of A", delete "$\Gamma^2$" and insert therefor --$\sigma^2$--.

Signed and Sealed this

Eleventh Day of November, 2008

JON W. DUDAS
*Director of the United States Patent and Trademark Office*